United States Patent [19]
Enami et al.

[11] Patent Number: 5,661,382
[45] Date of Patent: Aug. 26, 1997

[54] MOTOR DRIVE CIRCUIT HAVING A SOFT SWITCHING CIRCUIT AND A PUSH-PULL CONFIGURATION OF TRANSISTORS OPERATED IN A LINEAR MODE

[75] Inventors: Ken Enami, Atsugi, Japan; Satoshi Yamamoto, San Jose, Calif.

[73] Assignee: International Business Machines Corporation, Armonk, N.Y.

[21] Appl. No.: 156,496

[22] Filed: Nov. 23, 1993

[30]      Foreign Application Priority Data

Nov. 27, 1992  [JP]  Japan ..................... 4-318425

[51] Int. Cl.⁶ ........................................... H02P 7/00
[52] U.S. Cl. ........................................ 318/439; 318/254
[58] Field of Search ............................. 318/439, 254, 318/138

[56]            References Cited

U.S. PATENT DOCUMENTS

| | | | |
|---|---|---|---|
| 4,473,781 | 9/1984 | Nielsen | 318/254 |
| 4,484,114 | 11/1984 | Ebbs | 318/138 |
| 4,510,422 | 4/1985 | Ogura | 318/254 |
| 4,527,102 | 7/1985 | Gotou | 318/254 |
| 4,546,294 | 10/1985 | Ban et al. | 318/138 X |
| 4,651,067 | 3/1987 | Ito et al. | 318/254 |
| 4,740,734 | 4/1988 | Takeuchi et al. | 318/254 |

*Primary Examiner*—Jonathan Wysocki
*Attorney, Agent, or Firm*—J. Michael Anglin; Karuna Ojanen

[57]             ABSTRACT

A circuit to drive a brushless motor which consumes less power because it uses pulse width modulation. The invention has at least two loops; one loop to control the switching of transistors in a push-pull configuration drives current in the different coils of the motor when those transistors connected to ground are driven in a linear, rather than a saturated, mode. This loop also incorporates a soft switching waveform shaping circuit which slowly switches the phase current so that the electromagnetic noise of the motor does not enter the magnetic head on the disk. The other loop actually controls the speed of the motor based on the linear mode of the transistors.

7 Claims, 5 Drawing Sheets

MOTOR DRIVE CIRCUIT HAVING A SOFT SWITCHING CIRCUIT AND A PUSH-PULL CONFIGURATION OF TRANSISTORS OPERATED IN A LINEAR MODE

BACKGROUND OF THE INVENTION

This invention relates to a drive circuit for a brushless motor.

Such a circuit using a PWM circuit for saving power has been known in the art. Its circuit configuration is shown in FIG. 5. In FIG. 5, 41 denotes a resistor for detecting the value of a current supplied to each of phase coils U, V, and W; 42 denotes a comparator for comparing a control input for controlling speed with the supply current value; 43 denotes a power supply for level regulation; 44 denotes a chopping wave generator circuit; and 45 denotes a comparator. The chopping wave generator circuit 44 and the comparator 45 generate a pulse depending on the output of the comparator 42. Q2–Q7 denote transistors for driving the phase coils U, V, and W; and Q2A, Q4A, and Q6A are transistors for driving the transistors Q2, Q4, and Q6, respectively.

1 denotes an current switching circuit for supplying a current to predetermined phase coils whose output is generated by a starter circuit 2, an oscillator 3, and a ring counter 4 when starting the motor and is generated by the back electromotive voltages of the phase coils U, V, and W during the operation which are detected by OP amplifiers 5, 6, and 7. 8 denotes a start/back electromotive voltage detect switching circuit for determining output to the outside.

46 denotes a phase switching PWM pulse synthesizing circuit, which selects transistors to be turned on according to the output of the current switching circuit 1 and performs PWM control on the selected transistors according to the output pulse of the comparator 45. In the circuit shown in FIG. 5, the transistor Q2, Q4, or Q6 connected to the supply voltage VDD is completely turned on at starting, while only the transistor Q3, Q5, or Q7 connected to ground is PWM controlled by the control pulse during driving. 47 denotes a snubber circuit for eliminating noise which is generated when the transistors are switched.

The circuit described above is a drive circuit for a three-phase brushless motor, and uses the PWM circuit for saving power. This circuit compares the control input for speed control with the detected current value, and further compares the result of that comparison with the chopping wave to generate a pulse waveform and to switch the transistors to be driven.

Since this circuit performs switching relating to the PWM control for each phase, it requires a snubber circuit using three capacitors having large capacitance. Thus, the circuit has a problem that it requires a large packaging area and is expensive.

In addition, since the switching noise cannot be completely eliminated, electromagnetic noise produced by the motor coil may enter a signal detecting head and deteriorate the S/N ratio when the circuit is used for driving a spindle motor of a hard disk drive. Moreover, it cannot use a soft switching circuit which slowly switches the phase current to operate the driving stage. Therefore, there has been a problem due to rapid phase current switching that electromagnetic noise of the motor may enter the head and mechanical noise may occur.

The configuration of another conventional circuit is shown in FIG. 6. In FIG. 6, the same reference numerals as those used in FIG. 5 denote the same components. 10 denotes a soft switching waveform shaping circuit for making the rising or falling of current gradual, and 11 denotes a three-differential amplifier which selects transistors to be driven according to the output of the current switching circuit 1 inputted through the soft switching waveform shaping circuit 10, and controls the selected transistors. This three-differential amplifier controls the base current of the driven transistor according to the output of a comparator 12 which compares the speed control signal with the detected current value. In this case, the rising and falling of this base current are made gradual by the soft switching waveform shaping circuit 10. Moreover, the transistor Q2, Q4, or Q6 connected to the supply voltage VDD is completely turned on when it is driven, and only the transistor Q3, Q5, or Q7 connected to ground controls the collector current according to the base current inputted when it is driven.

The circuit such as shown in FIG. 6 has been popular (for example, it may be Panasonic AN 8221 FB manufactured by Matsushita Electronic Industries, Inc.), and widely used for driving a spindle motor of a hard disk drive.

In the circuit configured as above, the current flowing through each of the phase coils U, V, and W of the motor does not rapidly change as compared with the PWM control. Thus, it is possible to reduce the electromagnetic noise of the motor which would enter the head. In addition, the slow or gradual current switching allows it to reduce the motor vibration and hence the mechanical noise. Furthermore, since there is no rapid switching, the capacitors of the snubber circuit may be of small capacitance and the snubber circuit itself may even be eliminated to reduce the packaging area.

As described above, the conventional circuit shown in FIG. 6 has reduced electrical and mechanical noises and is functionally superior. In this circuit, however, since the transistors Q3, Q5 and Q7 connected to ground control the collector current according to the base current in a state where almost all of the differential voltage between the supply voltage VDD and the voltage applied to the phase coil is applied when they are driven, there is a problem that these transistors waste power.

SUMMARY OF THE INVENTION

An object of this invention is to provide a circuit for driving a brushless motor which has low power consumption, can reduce electromagnetic and mechanical noises during rotation of the motor, can reduce the capacitance values of the capacitors in the snubber circuit or even eliminate the snubber circuit, is inexpensive, and has a small packaging area.

Another object of this invention is to provide a circuit that is suitable for a driving circuit for a spindle motor of a hard disk drive.

To achieve the above objects, this invention provides a brushless motor drive circuit for driving a brushless motor including a stator provided with a plurality of phase coils forming a plurality of phases and a rotor having magnetic poles, comprising a position detecting means for detecting the relative positional relationship between the phase coils of said stator and the magnetic poles of said rotor, current switching means responsive to the output of said position detecting means for switching a supply current so that the current flows through predetermined phase coils among said plurality of phase coils, a current control means serially connected with said phase coils for controlling the value of said supply current flowing through said phase coil to a predetermined value, and a supply voltage control means for detecting a voltage applied to said current control means and controlling a voltage applied to the series circuit of said current control means and said phase coils so as to make said former voltage being a predetermined voltage.

According to this invention configured as above, the position detecting means detects the relative positional relationship between the phase coils provided on the stator and the magnetic poles formed on the rotor. According to the output of this position detecting means, the current switching means supplies a current to phase coils to which the current should be supplied. The value of this current is controlled to a predetermined value by the current control means connected to the phase coils in series. The supply voltage control means detects a voltage applied to the current control means, and controls a voltage to be applied to a series circuit of the phase coils and the current control means so that the detected voltage becomes a predetermined voltage.

The embodiments of this invention will be explained in detail with reference to the drawings.

BRIEF DESCRIPTION OF THE DRAWINGS

FIG. 1 is a circuit diagram illustrating one embodiment of this invention in which the same reference numerals as those shown in FIG. 6 denote the same components. 21 denotes a current source, and D1–D3 denote diodes. These diodes D1–D3 and the current source 21 detect the lowest back electromotive voltage among those of the phase coils U, V, and W. 22 denotes a comparator, and 23 denotes a chopping wave generator circuit. The comparator 22 compares a chopping wave generated from the chopping wave generator circuit 23 with a voltage VE and generates a pulse for driving a switching transistor Q1. In addition, a coil L1 and a capacitor C1 constitute a smoothing circuit for reducing voltage ripple.

Here, the pulse for driving the switching transistor Q1 outputted from the comparator 22 varies to shorten the "on" period of the transistor Q1 when the voltage VE rises above a predetermined voltage, and to lengthen the "on" period of the transistor Q1 when the voltage VE falls below the predetermined voltage. The predetermined voltage referred to herein means the sum of the lowest value of the collector-emitter voltage VCE of the transistors Q3, Q5 and Q7 connected to ground by which the current flowing through the phase coils can be controlled, and the forward bias voltage Vf of the diode. That is, when the voltage VE rises, the applied voltage VC falls to reduce the voltage VE to the predetermined voltage, and when the voltage VE falls, the applied voltage VC rises to increase the voltage VE to the predetermined voltage.

The operation of this embodiment is described below.

Figure 1:
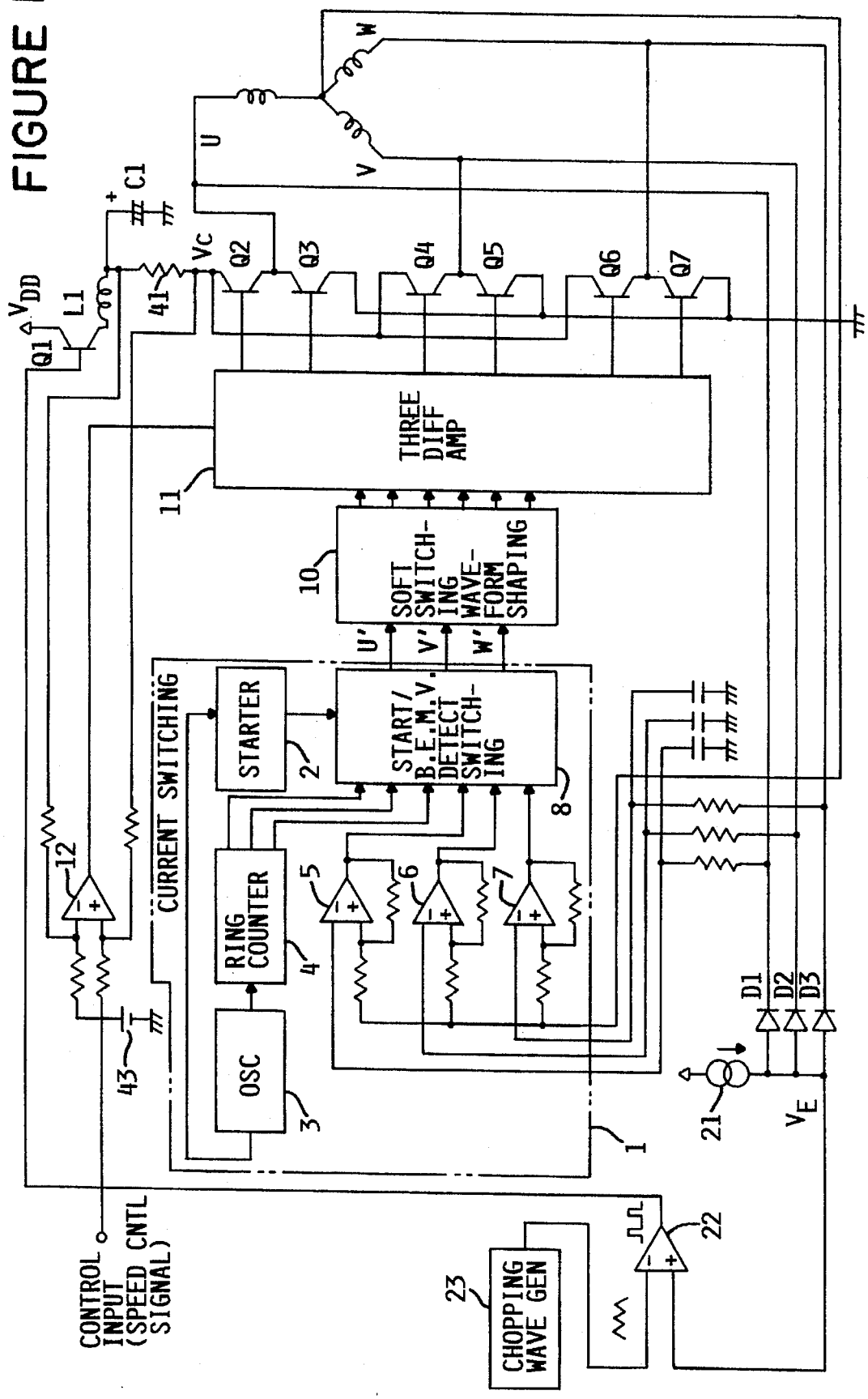
FIG. 1 is a circuit diagram showing the configuration of one embodiment of this invention.
Figure 2:
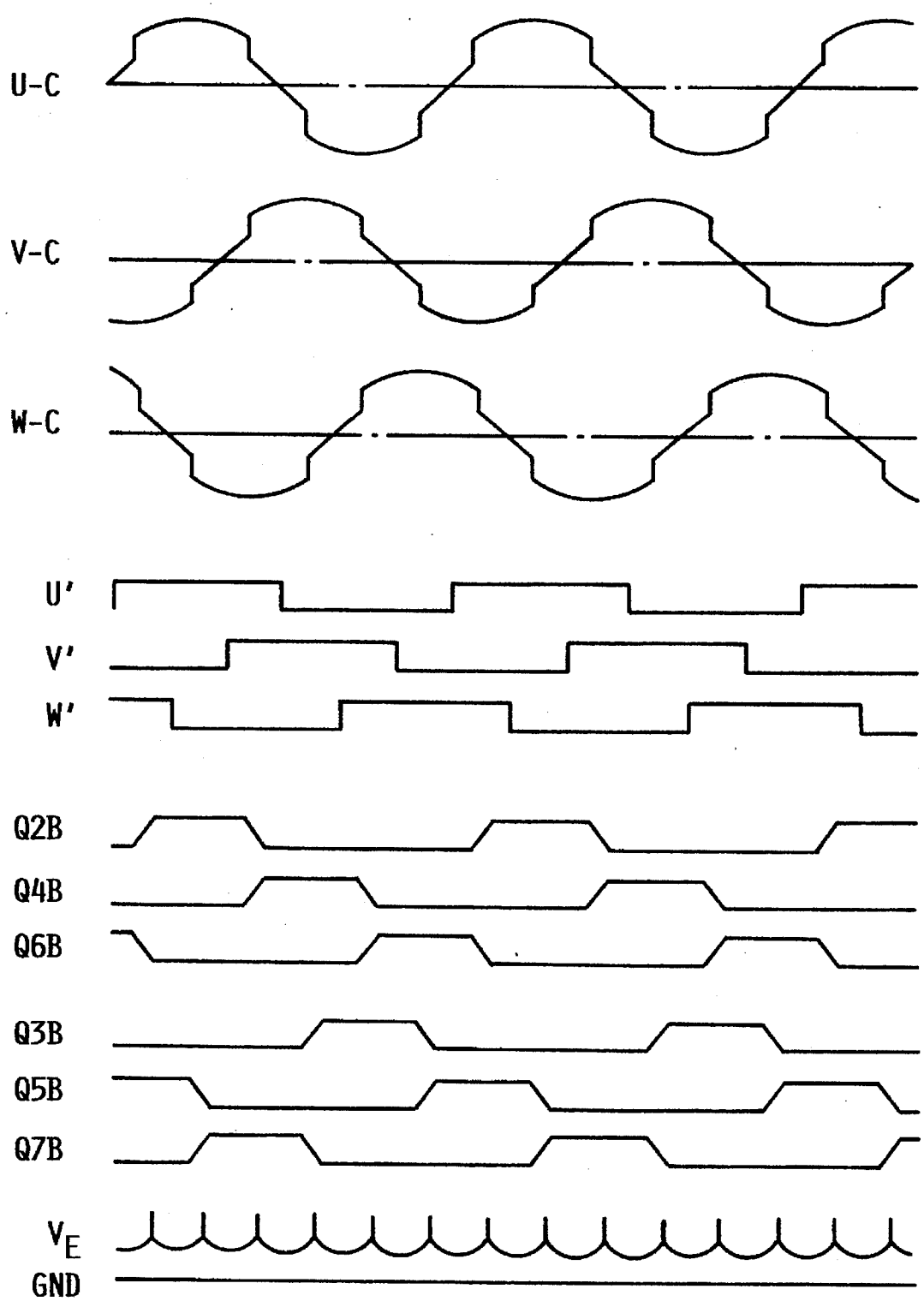
FIG. 2 shows waveforms at various portions in the embodiment shown in FIG. 1.

FIG. 2 shows waveforms of voltages at various portions in the embodiment during normal operations wherein U-C, V-C, and W-C are back electromotive voltages of the respective phase coils, U', V', and W' are output waveforms of the current switching circuit 1; Q2B through Q7B are waveforms of voltages applied to the bases of transistors Q2 through Q7, respectively, and VE is a voltage waveform at the anodes of diodes D1–D3.

During normal operations, the back electromotive voltages U-C, V-C, and W-C of the phases U, V, and W are detected by the OP amplifiers 5, 6, and 7 in the current switching circuit 1 to generate the outputs U', V', and W' of the current switching circuit 1. The soft switching waveform shaping circuit 10 and the three-differential amplifier 11 generate the voltages Q2B–Q7B to be supplied to the bases of transistors Q2–Q7 based on these outputs U', V', and W' of the current switching circuit 1.

As indicated by Q2B–Q7B, switching of phase current is performed slowly since the soft switching waveform shaping circuit 10 is used. In addition, the current flowing through the phase coils is sequentially switched depending on the position of the rotor of the motor so that any one of the three transistors Q3, Q5, and Q7 connected to ground which is not paired with a transistor in the "on" state of the three transistors Q2, Q4, and Q6 connected to the supply voltage VDD, is always in the "on" state. Moreover, the voltage applied to the transistor Q2, Q4, or Q6 connected to the supply voltage VDD is selected to have a value that completely turns on the transistor, while the voltage applied to the transistor Q3, Q5, or Q7 connected to ground has a value that makes the collector current of transistor have a value indicated by the comparator 12.

Figure 6:
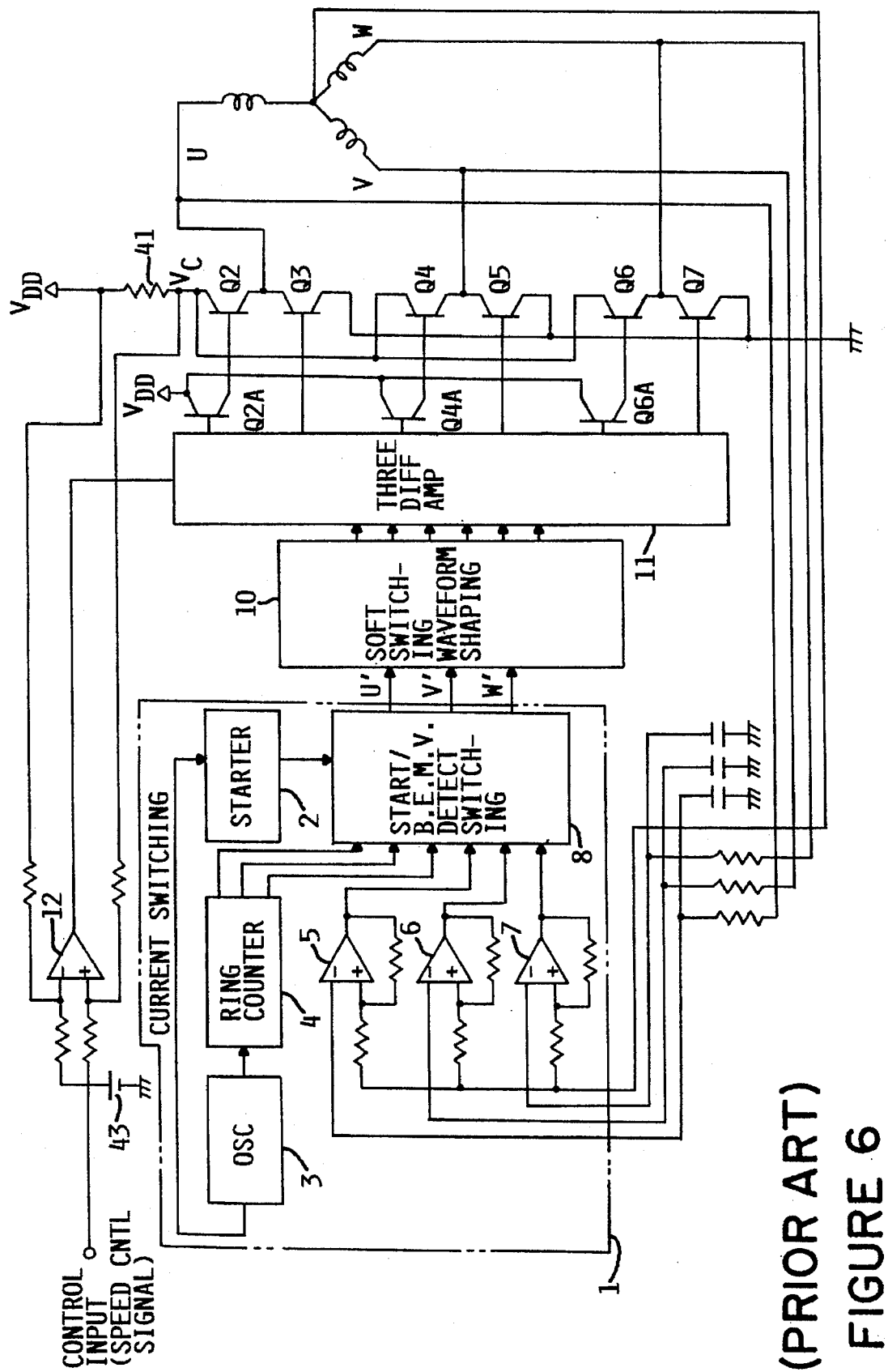
FIG. 6 shows the configuration of another conventional circuit.

The operation just described is similar to the operation of the conventional circuit shown in FIG. 6.

The collector-emitter voltage VCE of the operating transistor among the transistors Q3, Q5, and Q7 connected to ground is detected as the voltage VE, which is the sum of VCE and the forward bias voltage Vf of the diodes D1–D3. This voltage VE is inputted to the comparator 22, where it is compared with the chopping wave. As the result of comparison, the comparator 22 outputs to the switching transistor Q1 a driving pulse for maintaining the applied voltage VC at the current level.

Figure 3:
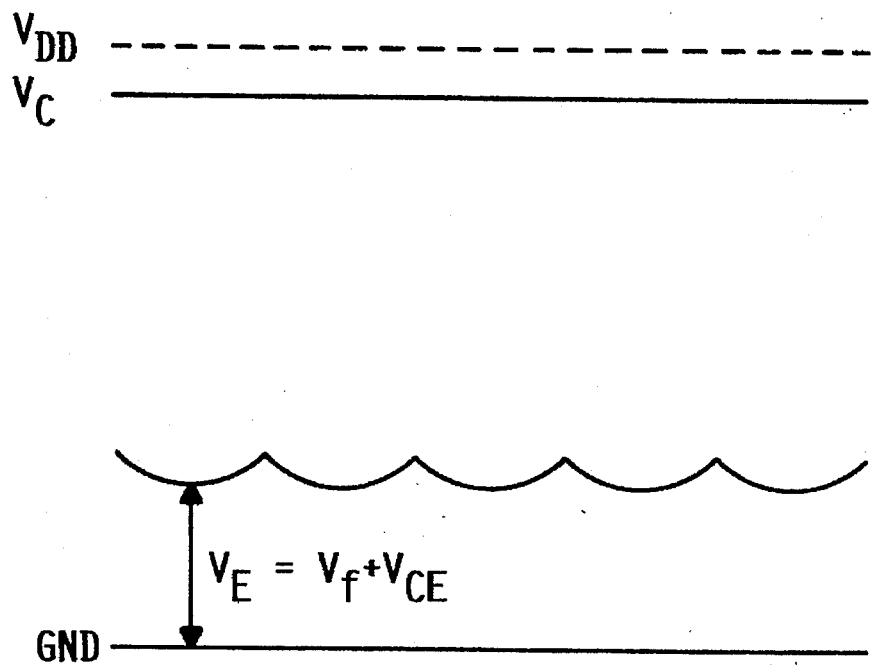
FIG. 3 is a diagram explaining the operation of the embodiment shown in FIG. 1.
Figure 4:
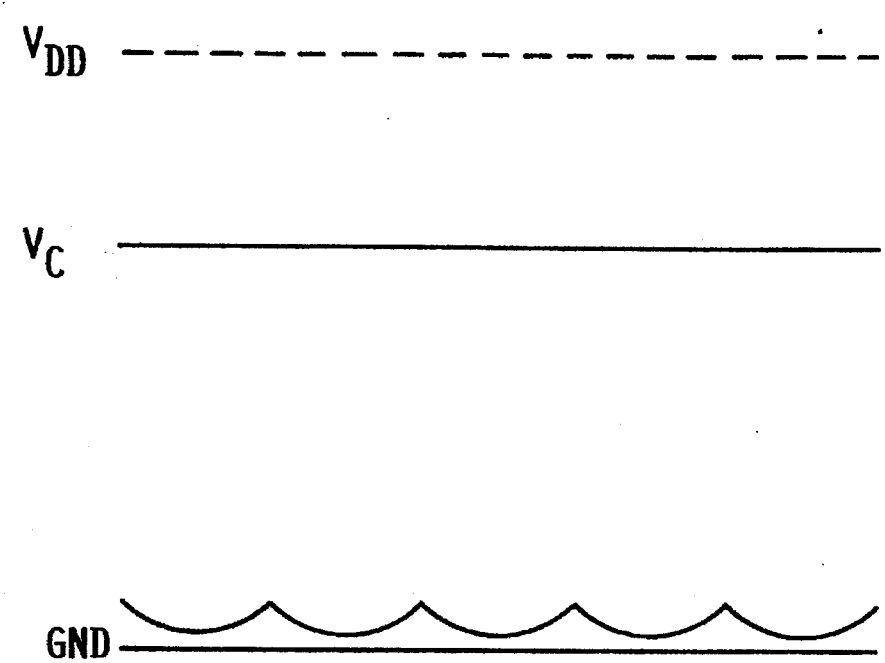
FIG. 4 is a diagram explaining the operation of the embodiment shown in FIG. 1.
Figure 5:
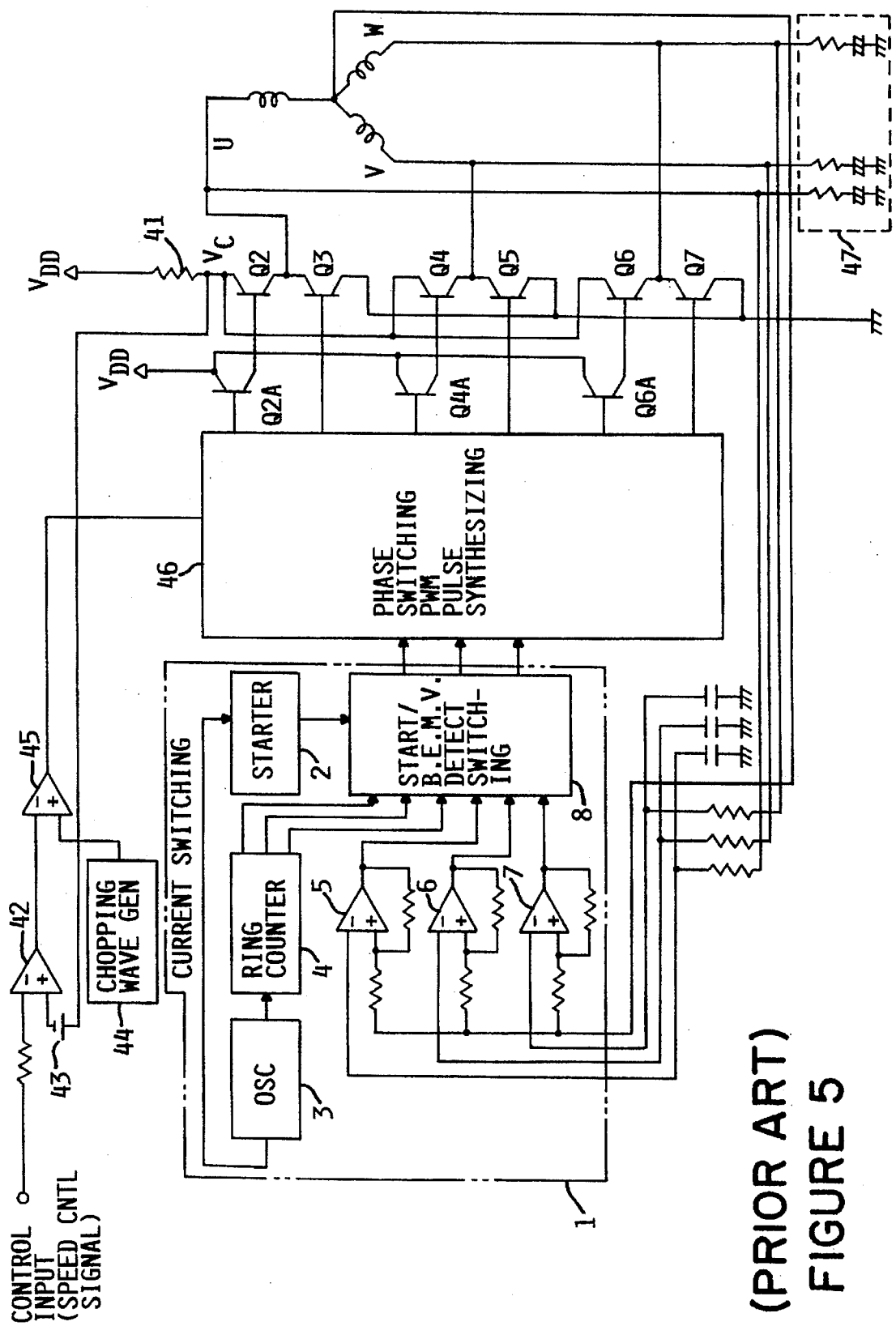
FIG. 5 shows the configuration of a conventional circuit.

In such a state, if the voltage VE rises as shown in FIG. 3 for some reason such as for example a change of control input, the driving pulse from the comparator 22 varies to shorten the "on" period of the switching transistor Q1. Consequently, the applied voltage VC decreases, and finally, when the voltage VE reaches the predetermined voltage, the applied voltage VC stops decreasing and is maintained in that state.

As described above, according to this embodiment, it is possible to significantly lower the ineffective power consumed by the transistors as compared with the conventional circuit shown in FIG. 6 since the collector-emitter voltages of all the transistors in the path in which the current for driving the brushless motor flows can be reduced.

Furthermore, if the OP amplifiers and active devices such as transistors used in the embodiment are integrated in a single IC chip, it is possible to obtain a brushless motor driving device which is inexpensive and has a small packaging area.

Moreover, the circuit of this embodiment is well suited for driving a spindle motor of a hard disk drive since it has less electrical and mechanical noises and consumes less power.

As described above, this invention can provide a brushless motor drive circuit which consumes less power, can reduce electrical and mechanical noises during rotation of the motor, and has a small packaging area.

We claim:

1. A drive system for a DC motor having a plurality of phase coils, comprising:

(a) an electromotive voltage detector to detect the lowest back electromotive voltage of any one coil of said plurality of phase coils;

(b) a pulse width modulation comparator which generates a pulse width modulation signal related to an output of the electromotive voltage detector;

(c) a switching transistor and a smoothing circuit whose input is the pulse width modulation signal; the width of the pulse width modulation signal determining how long the switching transistor is turned on;

(d) a plurality of transistors, a pair of transistors in a push-pull arrangement for each coil, the collector of one of the pair driven by an output of the switching transistor and the smoothing circuit; the other of the pair having its emitter connected to ground; the base of all of the plurality of transistors connected to a differential amplifier arrangement;

(e) a switching controller wherein a back electromotive voltage of each coil is also input and which switching controller generates an output to a soft switching waveform circuit into the differential amplifier to switch which of said pairs of transistors to turn on; and (f) a current control unit connected to the differential amplifier arrangement, the current control unit connected to read the output of the switching transistor and the smoothing circuit and compare it with a desired speed signal to input into the differential amplifier arrangement.

2. The drive system for a DC motor of claim 1, wherein the transistors of the plurality of transistors having its emitters are connected to ground are driven in a linear mode to control the speed of the motor.

3. The drive system for a DC motor of claim 1 wherein said electromotive voltage detector further comprises a current supply and a plurality of semiconductor devices, each one of said plurality of semiconductor devices connected to detect the back electromotive voltage of one of said phase coils.

4. The drive system for a DC motor of claim 1 wherein said current control unit controls the speed of the DC motor.

5. The drive system for a DC motor of claim 1 wherein the number of coils is three, the number and type of semiconductor devices are three diodes, the number of said plurality of transistors is six, one pair for each coil, and the differential amplifier arrangement is a three differential amplifier.

6. A motor controller for a DC motor, comprising:

(a) a first loop to detect the voltage on one of plurality of transistors connected to ground;

(b) a second loop to control the speed of the motor by applying current to one of said transistors driven in a linear mode.

7. A drive system for a brushless DC motor having a plurality of phase coils forming a plurality of phases and a rotor having magnetic poles, comprising:

(a) an electromotive voltage detector comprising a current supply and a plurality of diodes, each one of said plurality of diodes connected to detect the lowest electromotive voltage of any one coil of said plurality of phase coils;

(b) a plurality of transistors, a pair of transistors in a push-pull arrangement for each coil, the collector of one of the pair driven by an output of a switching transistor and a smoothing circuit; the other of the pair driven in a linear mode and having its emitter connected to ground and its collector current with a value of a speed control comparator; the base of all of the plurality of transistors connected to a differential amplifier arrangement;

(c) a pulse width modulation comparator which generates a pulse width modulation signal related to an output of the electromotive voltage detector and a predetermined voltage comprising the sum of the lowest value of the collector-emitter voltage of the one of said pair of transistors having its emitter connected to ground and driven in a linear mode and the forward bias voltage of each of said diodes;

(d) a switching circuit comprising the switching transistor and the smoothing circuit; the pulse width modulation signal being input into the switching circuit; the width of the pulse width modulation signal determining how long the switching transistor is turned on;

(e) a switching controller comprising at least one operational amplifier for each phase coil wherein a back electromotive voltage of each coil is also input into one of each of said operational amplifiers generates an output to a soft switching waveform circuit into the three differential amplifier to switch which of said pairs of transistors to turn on; and (f) a current control unit connected to the differential amplifier arrangement, the current control unit connected to read the output of the switching transistor and the smoothing circuit and compare it with a desired speed signal in the speed control comparator to input into the differential amplifier arrangement to control the speed of the DC motor.

* * * * *